United States Patent
Faller et al.

(10) Patent No.: US 6,491,884 B1
(45) Date of Patent: Dec. 10, 2002

(54) IN-SITU AIR OXIDATION TREATMENT OF MOCVD PROCESS EFFLUENT

(75) Inventors: Rebecca Faller, Hayward, CA (US); Mark Holst, Sunnyvale, CA (US)

(73) Assignee: Advanced Technology Materials, Inc., Danbury, CT (US)

(*) Notice: Subject to any disclaimer, the term of this patent is extended or adjusted under 35 U.S.C. 154(b) by 51 days.

(21) Appl. No.: 09/717,439

(22) Filed: Nov. 21, 2000

Related U.S. Application Data

(60) Provisional application No. 60/167,576, filed on Nov. 26, 1999.

(51) Int. Cl.[7] ............................. C01B 7/00; B01D 53/54
(52) U.S. Cl. ..................... 423/210; 423/248; 502/38; 96/108; 96/130
(58) Field of Search ............................. 423/248, 210; 502/38; 422/93, 273; 96/108, 121, 130; 45/95

(56) References Cited

U.S. PATENT DOCUMENTS

| | | | |
|---|---|---|---|
| 4,442,078 A | * | 4/1984 | Jalan et al. ................. 423/230 |
| 4,593,148 A | * | 6/1986 | Johnson et al. ............. 585/823 |
| 4,696,806 A | * | 9/1987 | Peterson et al. ............ 423/248 |
| 4,743,435 A | * | 5/1988 | Kitahara et al. ............ 423/210 |
| 4,877,920 A | * | 10/1989 | Lush et al. .................. 585/823 |
| 4,894,210 A | * | 1/1990 | Denny et al. ................ 423/230 |
| 4,910,001 A | | 3/1990 | Kitahara et al. |
| 4,996,030 A | | 2/1991 | Kitahara et al. |
| 5,024,823 A | | 6/1991 | Gokcek |
| 5,037,624 A | | 8/1991 | Tom et al. |
| 5,182,088 A | * | 1/1993 | Leondaridis et al. ........ 423/210 |
| 5,451,378 A | | 9/1995 | Russell et al. |
| 5,704,965 A | | 1/1998 | Tom et al. |
| 5,785,741 A | | 7/1998 | Li et al. |
| 5,837,636 A | * | 11/1998 | Sechrist et al. ............... 502/35 |
| 5,866,752 A | | 2/1999 | Goozner |
| 5,877,392 A | | 3/1999 | Russell et al. |
| 5,977,687 A | | 11/1999 | Tom et al. |
| 6,030,591 A | * | 2/2000 | Tom et al. ................... 423/240 |
| 6,153,150 A | | 11/2000 | Moore et al. |
| 6,221,241 B1 | * | 4/2001 | Carnell et al. .............. 208/248 |

FOREIGN PATENT DOCUMENTS

| | | | |
|---|---|---|---|
| EP | 280585 | * | 8/1988 |
| JP | 35503141 | * | 5/1980 |
| WO | WO 00/35573 | | 6/2000 |

* cited by examiner

Primary Examiner—Savitri Mulpuri
(74) Attorney, Agent, or Firm—Oliver A. Zitzmann; William Ryann; Steven J. Hultquist

(57) ABSTRACT

An effluent abatement system for abating hydride species in a hydride-containing effluent, arranged for carrying out the steps of: (1) contacting the hydride-containing effluent with a dry scrubber material comprising a metal oxide that is reactive with the hydride species to remove the hydride species from the effluent, until the capacity of the dry scrubber material for hydride species is at least partially exhausted; and (2) contacting the at least partially exhausted capacity dry scrubber material with an oxidant to at least partially regain the capacity of the dry scrubber material for the hydride species. The system of the invention has particular utility in the treatment of effluent from III-V compound semiconductor manufacturing operations.

26 Claims, 4 Drawing Sheets

IN-SITU AIR OXIDATION TREATMENT OF MOCVD PROCESS EFFLUENT

CROSS REFERENCE TO RELATED APPLICATION

This application claims the benefit of U.S. Provisional Application Ser. No. 60/167,576 filed on Nov. 26, 1999 in the names of Rebecca Faller and Mark Holst.

BACKGROUND OF THE INVENTION

1. Field of the Invention

This invention relates to a process and apparatus for the treatment of effluents produced by metalorganic chemical vapor deposition (MOCVD).

2. Description of the Related Art

One of the fastest growing semiconductor markets is the compound semiconductor market. The products in this market include devices formed from III-V compositions, such as light emitting diodes (LEDs), high temperature semiconductors and high frequency semiconductors for telecommunications devices.

The III-V compound semiconductors include as the "III" constituent one or more of the metals or semimetals in Group III of the Periodic Table, such as Al, Ga, or In. The "V" constituent of such compound semiconductors is constituted by one or more of the non-metals in Group V of the Periodic Table, such as P or As.

The most widely used manufacturing method for forming III-V compound semiconductors is metal organic chemical vapor deposition (MOCVD). Typical sources for Group V elements include, but are not limited to, arsine ($AsH_3$), phosphine ($PH_3$), tertiary-butyl arsine (TBA), and tertiary-butyl phosphine (TBP), all gaseous materials.

In a typical MOCVD recipe for forming a III-V compound semiconductor, the arsine and phosphine, and/or TBA and TBP, pass into the reactor along with large flows of hydrogen. An estimated 70–95% of arsine and 30–50% of phosphine is destroyed in the MOCVD processing tool, with the As and P depositing on the semiconductor wafer. The remainder of the unreacted arsine and phosphine passes through the tool and then through the pumping system at the exit of the tool, where it is mixed with ballast nitrogen from the pump. Table 1 below shows the components and constituent flows of the gases entering a typical MOCVD tool.

TABLE 1

Gases Entering Typical MOCVD Tool

| Gas | Flow Rate (slpm) |
| --- | --- |
| Arsine | 0.5–1.5 |
| Phosphine | 0.5–1.5 |
| Hydrogen | 50 |
| TMG (trimethylgallium) | 0.002 |

The corresponding components and constituent flows of the gases discharged from the tool and post-pump system are set out in Table 2 below.

TABLE 2

Gases Exiting Tool & Post-Pump System

| Gas | Flow Rate (slpm) | Concentration (ppm) |
| --- | --- | --- |
| Arsine | — | 300–6000 |
| Phosphine | — | 3000–14,000 |
| Hydrogen | 50 | — |
| Nitrogen | 25 | — |

The foregoing Table 1 and Table 2 gas components, flow rates and concentration are illustrative, with actual composition of the post-pump effluent in a specific process system being highly dependent on the operating conditions, including the recipe conditions and the efficiency of the tool. In general, however, the concentrations of arsine and phosphine exiting the tool are significantly higher than the threshold limit values (TLVs) of these gases. The TLV for arsine is 50 ppb while the TLV for phosphine is 300 ppb. It therefore becomes necessary to abate the arsine and phosphine exiting the tool.

Effluents that contain arsine and phosphine, typically referred to as hydrides, from MOCVD processes have been successfully abated with dry scrubbers. These dry scrubbers conventionally comprise a mixture of metal oxides. The oxides, usually in the form of a powder, are combined with a small amount of binder material to yield a formable material that can then be extruded, pelletized, or otherwise formed into a small shape to enhance the total surface area and the mass transfer coefficient of the material. These shaped materials are then placed, in bulk, into a container where they are used for the abatement of hydrides.

The chemistry involved in the abatement of the effluent by metal oxides (MOs), where the hydride is arsine (As), is as follows:

Phosphine ($PH_3$) undergoes a similar reaction with metal oxides:

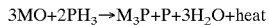

Various metal oxides have been found to react in such a manner. These metal oxides include, but are not limited to, oxides of transition metals such as copper oxide, zinc oxide, silver oxide, cobalt oxide, iron oxide, nickel oxide, manganese oxide, and molybdenum oxide.

Metal oxide dry scrubbers have been proven to work well in the abatement of hydrides in the effluent of MOCVD tools, but there are accompanying deficiencies of such effluent treatment.

Firstly, the effluent from MOCVD tools typically contains a large amount of hydrogen. The metal oxides in the dry scrubbing material can be reduced to metals by reaction with hydrogen, thus depleting the capacity of the dry scrubber for the hydrides. Such reduction reaction generally occurs at temperatures greater than room temperature, although the exact temperature necessary for such reaction to proceed depends on the metal oxide species in question.

Secondly, the reactions discussed hereinabove, wherein the metal oxide-containing dry scrubber reacts with hydrides, are exothermic in character. The heat generated by the hydride/metal oxide reaction is problematic as it can cause the reduction reaction between the metal oxides and hydrogen to become accelerated, thus depleting capacity.

Thirdly, in the use of the MOCVD process, it generally is strongly desired to increase the flow rates of hydrides to the processing tool, in order to effect high throughput operations. Such increase in hydrides, however, yields an increase in hydride concentration in the effluent of the tool, thus ultimately and undesirably increasing the heat formed during abatement.

Fourthly, an analysis of the reaction products of the above-described metal oxide/hydride reactions reveal that arsenic and phosphorus are formed. Phosphorus is particularly problematic as it can react upon exposure to air. If the reacted dry scrubbing media is not properly treated, a potentially hazardous situation may result.

In general, the problems associated with using dry scrubbing for the abatement of hydrides in the effluent of MOCVD processing can be generalized into the following categories: a) heat management problems, b) loss of treatment capacity of the scrubber material, necessitating remedial treatment to restore capacity lost due to metal oxide reduction, and c) the accumulation of hazardous materials in the dry scrubber bed, and the resultant necessity of treatment to remove hazardous materials from the dry scrubber bed.

It would therefore be a significant advance in the art to provide an abatement process that overcomes the aforementioned problems associated with the treatment of MOCVD process effluents and other gaseous effluents posing corresponding effluent treatment issues.

SUMMARY OF THE INVENTION

This invention relates to a process and apparatus for the treatment of effluents produced by metalorganic chemical vapor deposition (MOCVD).

The present invention relates in one aspect to an effluent abatement process for abating hydride species in a hydride-containing effluent, said process comprising (1) contacting the hydride-containing effluent with a dry scrubber material comprising a metal oxide that is reactive with the hydride species to substantially remove the hydride species from the effluent, until the capacity of the dry scrubber material for hydride species is at least partially exhausted, and (2) contacting the at least partially exhausted capacity dry scrubber material with an oxidant to at least partially regain the capacity of the dry scrubber material for the hydride species. Preferably the oxidant contacts the at least partially exhausted capacity dry scrubber material in the absence of contact with the hydride-containing effluent.

In another aspect, the invention relates to an effluent abatement system for abating hydride species in a hydride-containing effluent. Such process system comprises: a bed of dry scrubber material that is reactive with the hydride species in the hydride-containing effluent to remove the hydride species from the effluent; a source of the hydride-containing effluent joined in gas supply relationship to the bed of dry scrubber material; a source of an oxidant effective to regenerate the dry scrubber material subsequent to diminution of hydride removal capacity thereof, joined in oxidant supply relationship to the bed of dry scrubber material; and flow circuitry arranged to flow the hydride-containing effluent and the oxidant in contact with the bed of dry scrubber material. Preferably, the flow circuitry is arranged to repetitively and alternatingly flow the hydride-containing effluent and the oxidant in contact with the bed of dry scrubber material. Alternatively, the flow of oxidant and hydride-containing effluent may contact the dry scrubber material simultaneously.

Other objects, features and advantages of the invention will be more fully apparent from the ensuing disclosure and appended claims.

DETAILED DESCRIPTION OF THE INVENTION, AND PREFERRED EMBODIMENTS THEREOF

In accordance with the present invention, effluents from a semiconductor manufacturing plant, typically containing hydrides, such as $AsH_3$, $PH_3$, TBA, TBP, $SiH_4$, $GeH_4$, $H_2S$, $H_2Se$ and combinations thereof, are introduced into a container or vessel to be abated by a metal oxide. It should be noted that the effluent stream may include other gaseous compounds in addition to the hydrides with the proviso that no chlorine-containing compounds are present in the effluent stream. It has been found that chlorine-containing compounds can interfere with the oxidation of the hydride components and/or deplete capacity of the metal oxides in the dry scrubbing system.

Generally, any metal oxide that can be reduced and/or oxidized may be used in the present invention. Applicable metal oxides may include, for example, copper, zinc, silver, cobalt, iron, nickel, manganese, molybdenum, chromium and combinations thereof. The metal oxide may be in powder form and combined with a binder material to be used in bulk or may be supported on a porous ceramic material, such as silica, alumina, zeolites and the like.

In accordance with the present invention, a flow of air is added to the container that holds the mixed metal oxide dry scrubber material. Preferably, the air is added to the container after the process effluent has stopped flowing, and functions as an oxidizing agent in interaction with the spent dry scrubbing material, according to the following stoichiometry wherein the hydride gas component includes arsine.

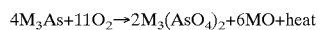

Alternatively, in the case where the hydride gas component comprises phosphine, the following reaction takes place:

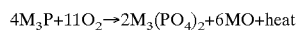

Other reactions may occur as well in the contacting of the air flow with the metal oxide scrubber material. The air may also acts to oxidize any free arsenic or phosphorus that may have been formed, to convert same to its respective oxide species, by the following reactions:

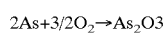

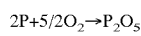

Thus, the addition of air and/or oxygen to the dry scrubber system acts to overcome the hazardous effects that otherwise may occur with any free arsenic or phosphorus that is formed during the abatement of the process effluent.

Further, the addition of air and/or oxygen to the spent dry scrubbing material acts to oxidize any metal oxide that was previously reduced by hydrogen or other reducing agents to the elemental metal, by the following reaction:

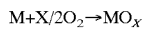

$$M + X/2 O_2 \rightarrow MO_X$$

The oxidation of the elemental metal back to the metal oxide active ingredient thereby serves to increase the total capacity of the dry scrubbing system. This increase in capacity is significant in magnitude.

Figure 1:
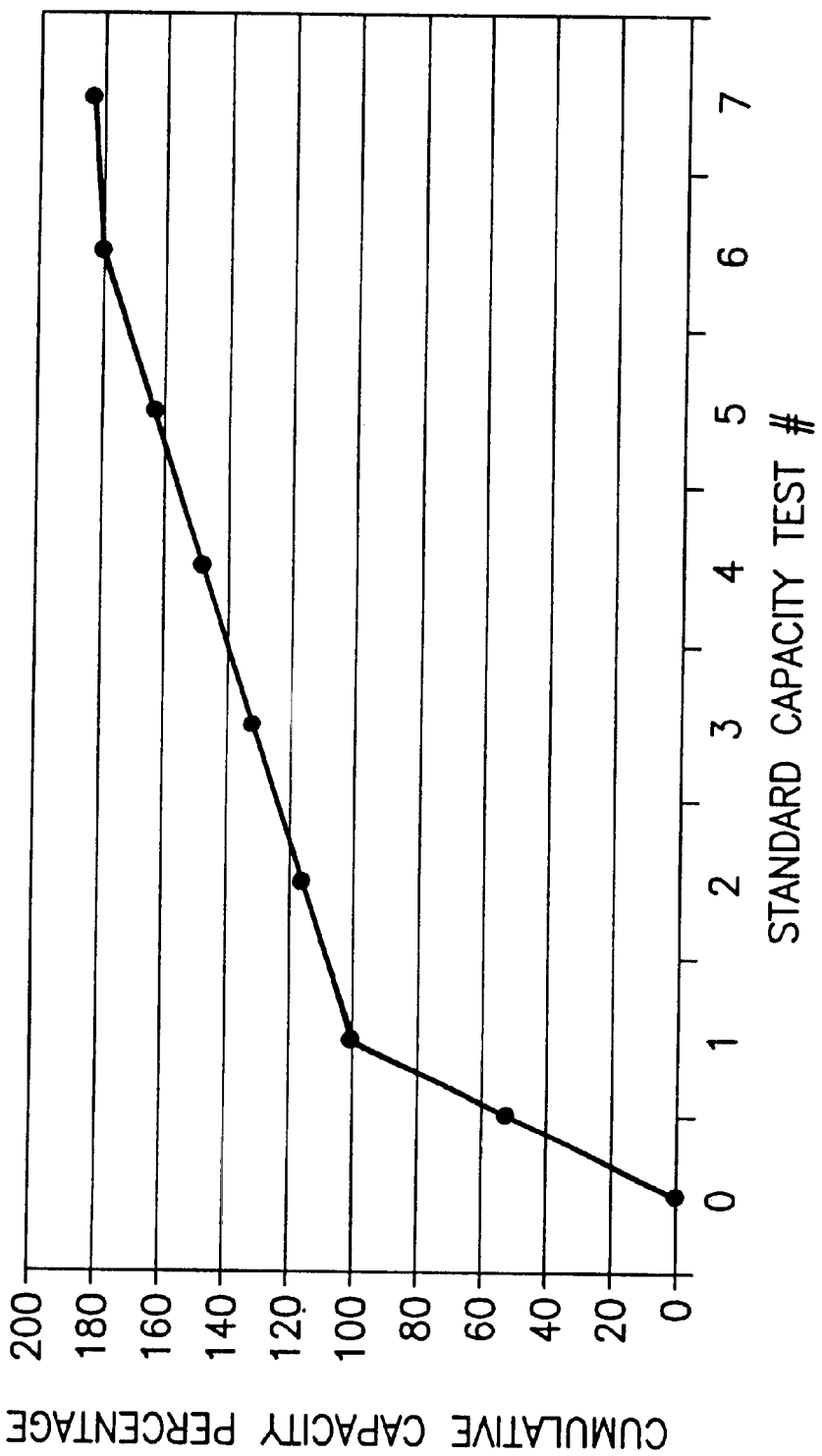
FIG. 1 is a graph of Cumulative Capacity Percentage after Air Oxidation, for a series of standard capacity tests.

By way of specific example, FIG. 1 shows the improvement afforded by the invention. A conventional copper oxide dry scrubbing material was exposed to arsine until breakthrough was detected. Following such breakthrough detection, the spent dry scrubbing material was air oxidized with a constant flow of clean, dry air (CDA). Following the oxidation, the dry scrubbing material was again exposed to arsine. This cycling of arsine and CDA in contact with the scrubber material was carried out until no significant regain of capacity was detected. FIG. 1 is a graph of the resulting data, showing the amount of capacity (Cumulative Capacity Percentage) gained after subsequent air oxidation cycles (each air oxidation cycle being following by a capacity determination (identified as Standard Capacity Test), with data for seven such cycles being shown in FIG. 1.

In the preferred practice of the invention, air is flowed into the dry scrubbing system as clean, dry air (CDA). The air may be flowed into the system during process effluent abatement, or preferably only after the process gas has stopped flowing. During air oxidation, the process effluent may be flowed to a second container of dry scrubbing material, as hereinafter more fully described. In such fashion, the air flow may be toggled on and off to each container while maintaining continuous process effluent flow, so that while the scrubber material in one container is undergoing air oxidation, the scrubber material in the other container will be abating the process effluent.

The air oxidation of the spent material must be thermally managed inasmuch as an excess amount of heat may be formed during the reactions associated with the oxidation. Specifically, the excess heat that is formed must be displaced rapidly, or negative effects on the capacity of the dry scrubbing system will result.

For example, arsenic trioxide is formed upon air oxidation of any free arsenic. Arsenic trioxide has a sublimation temperature of between 180° C. and 190° C. If air oxidation reaction is allowed to proceed at temperatures higher than the sublimation temperature of arsenic trioxide, there is a potential for arsenic trioxide to pass through the dry scrubbing system and condense to a solid downstream of the system, where it may constitute a hazard to persons exposed to the condensed solid.

Additionally, the metal oxide active components of the scrubbing material are susceptible to being reduced when they are exposed to reducing agents, if the temperature conditions are favorable for such reaction. The "reduction temperature" of the scrubber material is dependent on the metal oxide in question. There is a potential for the dry scrubber system to reach temperatures higher than the reduction temperature of the metal oxide(s) during air oxidation treatment of the scrubber material.

Although hydrogen from the process stream is not flowing through the scrubber container at the time of air oxidation of the metal oxide material therein, if the heat that is generated during air oxidation is not dissipated before flow of the process effluent through the scrubber container is resumed, then the dry scrubbing material may be sufficiently hot to cause reduction of the scrubber material when the effluent undergoing treatment is flowed through the hot bed of metal oxide.

Thus, if the dry scrubbing material is allowed to come into contact with the hydrogen present in the MOCVD process effluent while the temperature of the dry scrubbing system is greater than the reduction temperature of the metal oxide(s), then reduction of the metal oxide active ingredients to the metals will occur. This occurrence will render the dry scrubber material unable thereafter to abate any hydrides present in the process effluent.

Even though some metal oxide material may be reduced during abatement (contacting of the metal oxide scrubber material with the effluent), the metal thus formed can then be oxidized back to the metal oxide active ingredient during subsequent air oxidation. The temperature at which the metal is oxidized to the metal oxide can affect the crystal size of the reformed metal oxide. The higher the temperature, the smaller the crystals of reformed metal oxide will be. The smaller the crystals, the more total surface area of the crystals will be provided. If the oxidation reaction of the metal to the metal oxide is allowed to proceed at heightened temperatures, small pockets of extremely active, high surface area metal oxides can be formed. These pockets can then be reduced by hydrogen at room temperature, thereby depleting the capacity of the metal oxide(s) for the hydrides.

Based on the foregoing considerations, it is important to maintain the temperature of the dry scrubbing system as low as possible both during abatement as well as during air oxidation of the spent dry scrubber material. Preferably, the temperature of the dry scrubbing system is maintained from about 25° C. to about 150° C., and more preferably not exceeding 100° C., e.g., in a range of about 50° C. to about 100° C., and most preferably from about 70° C. to about 100° C.

The temperature of the dry scrubbing system may be correspondingly controlled by any suitable means, such as for example by the use of an interiorly disposed heat exchange structure in the bed of dry scrubbing material, such as a heat exchange coil inserted into the bed of the dry scrubbing material, by deployment of a jacketed container for the dry scrubbing material provided with coolant flow through the jacket of a suitable heat transfer medium, by use of a container for the dry scrubber material that is externally finned with extended area heat transfer surface elements, or by any other means or method for maintaining the temperature of the dry scrubbing material at the desired temperature level.

By way of specific example, the thermal management sub-system for maintaining the desired temperature may comprise an interiorly disposed coil in the container for the dry scrubbing material, wherein the coil is constructed of a highly heat conductive material, such as copper. Cold water or other aqueous or non-aqueous coolant medium, e.g., a glycol/water solution, may be employed as the coolant medium in such sub-system, and be flowed through the interior passage of the coil to dissipate any heat that may be formed both during abatement of hydrides as well as during the air oxidation of the spent dry scrubbing material. The coil is advantageously formed such that no significantly large regions of the dry scrubbing bed are out of heat transfer relationship with the coil. To determine the optimal spacings of the coil for effective cooling, a hydride may be flowed through a test bed of metal oxide scrubbing material and monitored for temperature in different regions of the bed. The coil may be structurally integrated in the interior volume of the container holding the dry scrubber material, e.g., using a support structure to fixedly position the coil.

The displacement of the dry scrubbing material by such coolant coil, and any capacity loss thereof, is more than compensated by the capacity reclaimed during air oxidation. Cold water may be flowed through the coil system continuously or intermittently dependent upon heat generated during air oxidation, and preferably the flow is continuous.

The effluent abatement system of the present invention may be advantageously configured, in one embodiment, as a dual bed system, comprising two containers holding respective beds of dry scrubber material, and arranged for cyclic alternating and repeating operation as hereinafter more fully described. In such a two-bed system, both containers may be equipped with a heat exchange coil or otherwise provided with thermal management elements for maintaining the temperature of the scrubber material within desired temperature operating limits. The coils in the respective containers may be supplied with coolant water, preferably in parallel rather than in series flow relationship.

In such embodiment, the flow rate of water through the coil as well as the flow rate of the CDA and the toggling rate (of change-over of the respective beds of dry scrubber material between the active abatement processing step and the air oxidation step) between the process effluent and the air flow is dependent upon a number of conditions. The flow rate of the coolant medium is dependent on the available temperature of the water or other coolant medium flowing through the heat exchange coil, the flow rate of the process gases to the MOCVD tool, and the composition of the mixed metal oxide scrubbing material.

In general, the cooling water and air flow rates should be at a sufficient rate to hold the temperature within the system to below the temperature at which reduction of the metal oxide occurs. Generally, the temperature is maintained in a range from about 25° C. to about 150° C. depending on the specific metal oxide and the temperature at which each is reduced by hydrogen. Preferably the temperature does not exceed about 100° C., e.g., in a range of from about 50° C. to about 100° C. Most preferably, the temperature is maintained in a range from about 70° C. to about 100° C. Maintaining a temperature within the scrubbing system at approximately 100° C. or below provides for both effective oxidation of the hydrides and regeneration of the metal oxide material when the active ingredient of the dry scrubbing material is primarily copper oxide. Moreover, reduction of the metal oxide by hydrogen gas is decreased thereby maintaining increased capacity of the metal oxide. Further, concerns regarding the formation of solid arsenic trioxide are eliminated.

Figure 3:
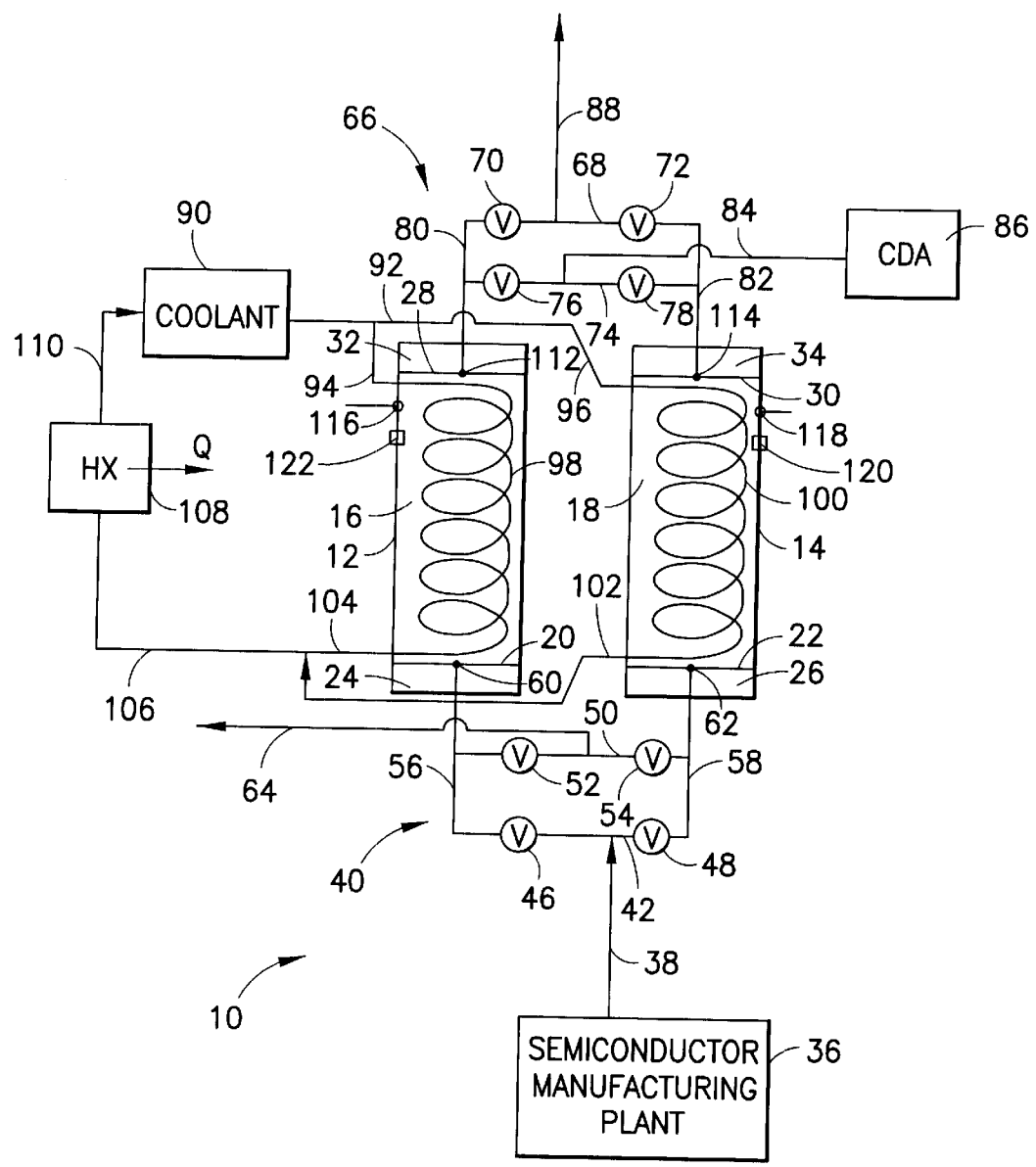
FIG. 3 is a schematic representation of a effluent abatement system according to one embodiment of the present invention, linked in gas flow relationship with a semiconductor manufacturing plant.
Figure 4:
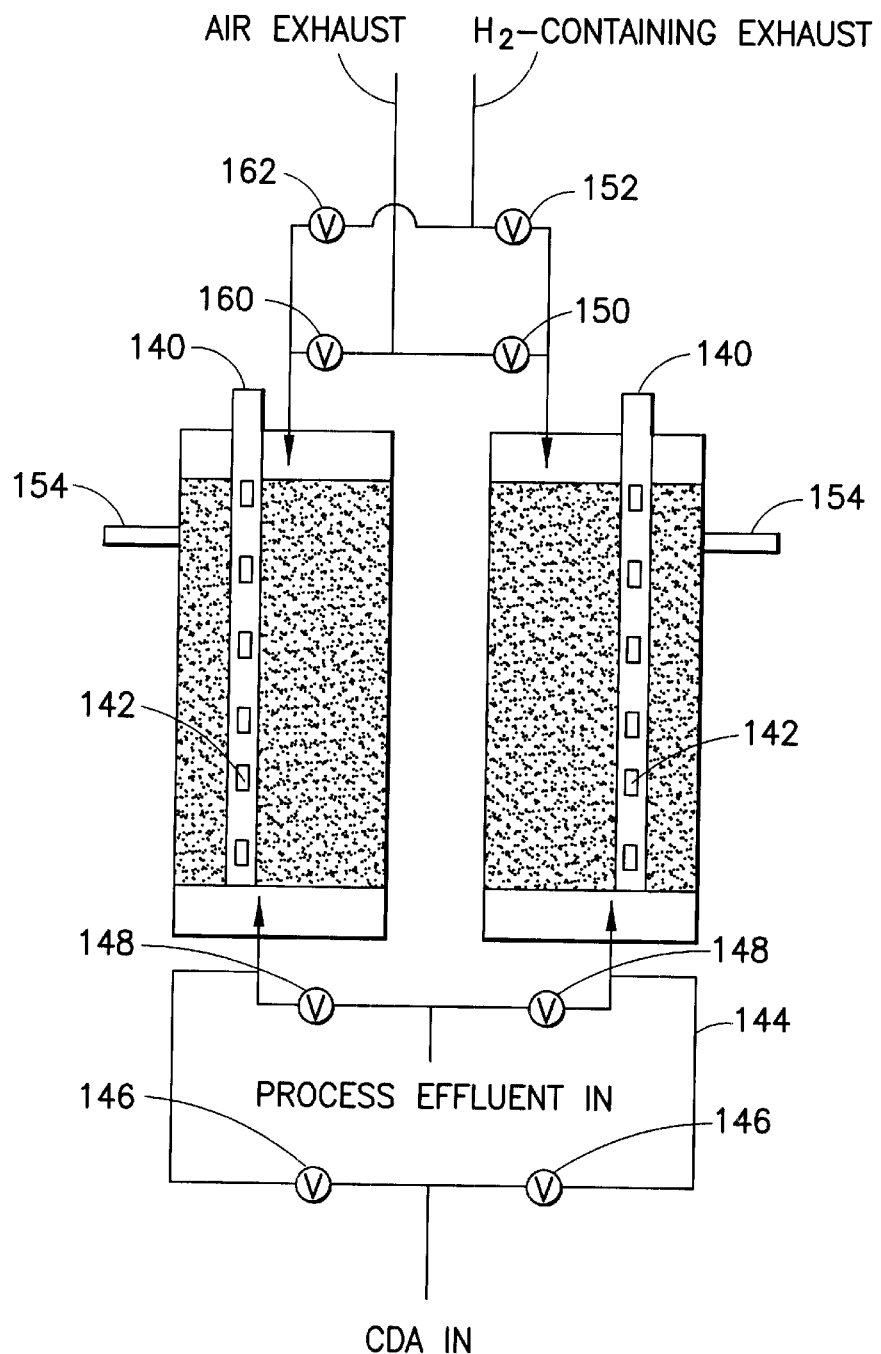
FIG. 4 is a schematic representation of another preferred embodiment of the present invention wherein the oxidant and effluent stream are flowed through the dry scrubber system in the same direction.

The dry scrubbing bed used in the practice of the present invention may be of any size and shape appropriate to the gases being processed. The flow of both process effluent and clean dry air through the bed can be in either an upward or a downward direction, in a vertically upstanding bed. Fixed or fluidized beds may be employed. Further, the process effluent may flow in the same direction as the clean dry air, as shown in FIG. 4, or in the opposite direction, as shown in FIG. 3. The flow preferably enters the bed at its cross-sectional center at the bed inlet (the cross-section being transverse to the flow direction of the gas stream being flowed through the bed). Before contacting the bed, the gas flow preferably enters a headspace (plenum space) above or below the bed. In order to provide headspace below the bed, a support may be inserted into the dry scrubber container in order to support the dry scrubber bed.

The aforementioned preferred "centered flow" introduction of gas streams to the bed counteracts any flow distribution problems that otherwise may occur in the flow of gas through the dry scrubber bed. Any suitable modes of flow may be employed, including up-flow and down-flow, as may be desirable in a given application to combat or minimize flow distribution problems.

In a specific illustrative embodiment, a dry scrubber container may be employed, utilizing an upflow design and operation, with centered up-flow of gas at the bed inlet, a heat exchange coil in the bed arranged for maintaining bed temperature at a desired temperature level, a thermowell into which may be inserted a thermocouple to monitor the temperature of the dry scrubber bed during process abatement and air oxidation, and a sensor tube to monitor the concentration of hydrides in the gas stream at the 90% consumption point of the dry scrubber bed.

A prototype of the container described in the preceding paragraph was modeled for temperature control functionality. The canister was filled with a calcium hydroxide, Ca(OH)$_2$ material. This material then was exposed to carbon dioxide, CO$_2$. The reaction of the two materials proceeds as follows:

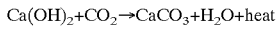

$$Ca(OH)_2+CO_2\rightarrow CaCO_3+H_2O+heat$$

Figure 2:
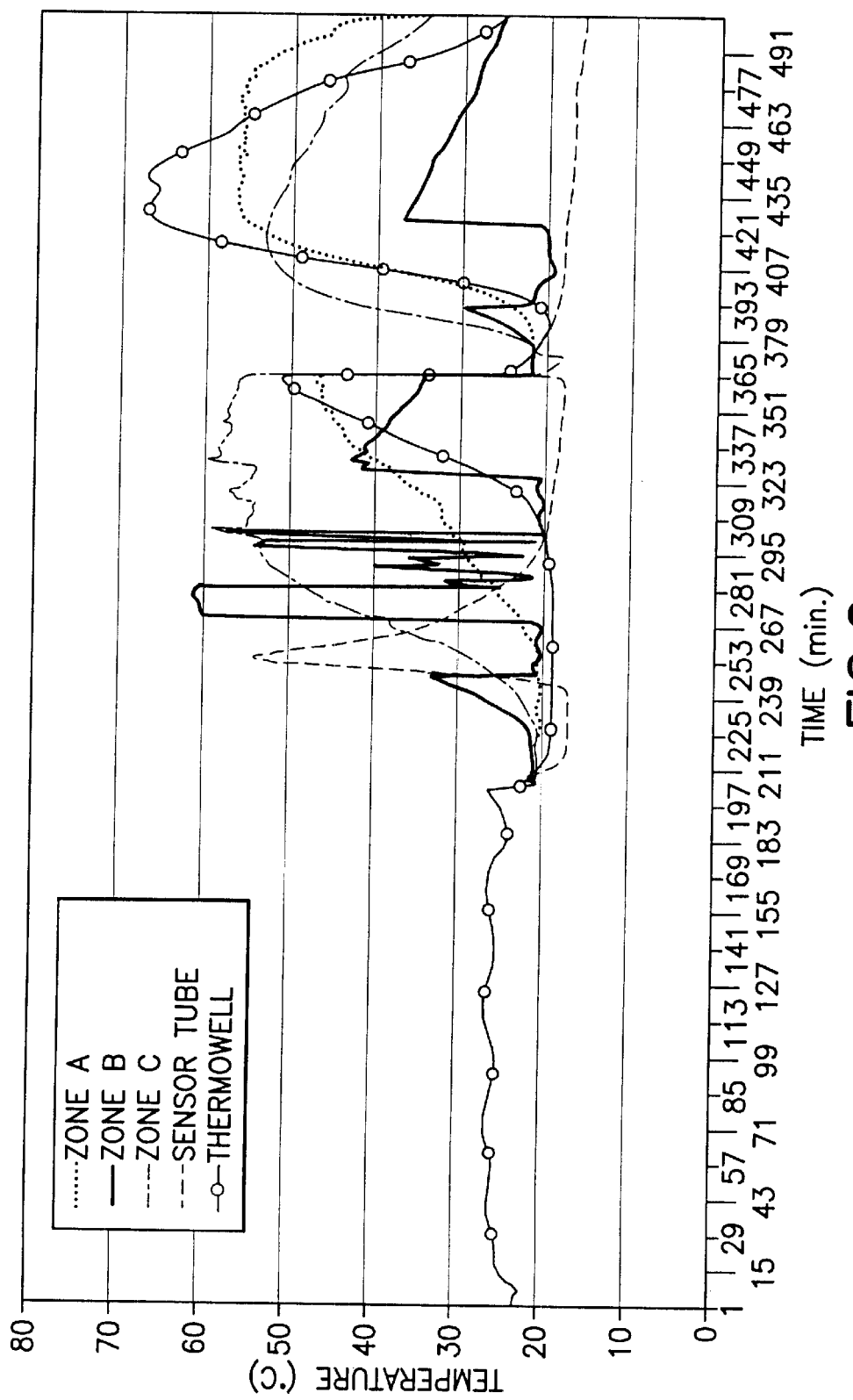
FIG. 2 is a graph of temperature (°C.) as a function of time, for a canister containing calcium hydroxide ($Ca(OH)_2$) that was contacted with carbon dioxide ($CO_2$) to model the performance behavior of the treatment unit.

The flow rate of the carbon dioxide was determined with the specific purpose of setting the heat resulting from the above reaction so that it was equal to the amount of heat that is generated when approximately 5 standard liters per minute (slpm) of arsine reacts with a copper oxide dry scrubbing material. By such determination and corresponding fixing of the carbon dioxide flow rate, the container system with in-situ temperature control was exposed to the amount of heat that it would see in regular usage when processing a representative semiconductor manufacturing effluent. During testing, the system was monitored for temperature. FIG. 2 is a graph of the temperature-time relationship of the system, for the temperatures that were recorded during such testing.

The test results show that the in-situ temperature control system was effective for the purpose of thermally managing the effluent abatement process system. The highest recorded temperature within the container system was 92.8° C., whereas without the temperature control, the highest recorded temperature was approximately 140° C.

Referring now to FIG. 3, there is shown a schematic representation of a semiconductor manufacturing plant 36 and an effluent abatement process system 10 according to one embodiment of the present invention.

The effluent abatement process system 10 includes containers 12 and 14 holding respective beds 16 and 18 of a suitable metal oxide dry scrubber material, e.g., copper oxide. In container 12, the dry scrubber material bed 16 is reposed on a screen, grid or other support structure 20, with the bed being correspondingly confined at its upper end by a corresponding structure 28. By this construction, a plenum space 24 is provided at the lower end of the container, and a plenum space 32 is likewise formed at the upper end of the container.

The container 14 is similarly constructed, with the dry scrubber material bed 18 being confined at its respective lower and upper ends by screen or grid elements 22 and 30, to thereby define lower plenum space 26 and upper plenum space 34, as illustrated.

The semiconductor manufacturing plant 36 may comprise any suitable semiconductor tool or multi-tool assembly, to carry out the desired formation/fabrication of semiconductor materials and/or device structures. The effluent gas comprising hydride constituents is discharged from the semiconductor manufacturing plant 36 in effluent discharge line 38, which is coupled to inlet manifold 40 of the effluent abatement process system 10.

The inlet manifold 40 comprises gas feed lines 56 and 58, joined to one another by manifold lines 42 and 50. Manifold line 42 contains valves 46 and 48, and manifold line 50 contains valves 52 and 54.

The manifold line 50 has connected thereto an air discharge line 64, as shown. The gas feed lines 56 and 58 of the inlet manifold 40 terminate in the lower plenum spaces 24 and 26, respectively, being joined at the terminus of each of such lines to gas flow distributor elements 60 and 62, respectively.

The purpose of the gas flow distributor elements 60 and 62 is to effect a central efflux of gas for distribution across the entire cross-section of the container, to provide uniform flow without occurrence of hydrodynamic anomalies, such as dead space, bypassing, etc.

The valves 46, 48, 50 and 52 of the inlet manifold 40 may be of any suitable type, and preferably are selectively actuatable according to a cycle time program. For such purpose, the valves preferably are operatively coupled with associated valve actuator elements (not shown) linked to a computer automatic control system (likewise not shown) for operating the valves with respect to their open or closed character, according to a suitable cycle time program.

The effluent abatement process system 10 also includes an effluent manifold 66 interconnecting the containers 12 and 14 as illustrated. The effluent manifold 66 comprises gas flow lines 80 and 82 connected to the respective vessels, terminating therein in the plenum spaces 32 and 34, respectively. At their termini, the gas flow lines 80 and 82 are coupled to gas distributor elements 112 and 114, which serve a same purpose as the gas distributor elements 60 and 62, viz, to ensure distribution of introduced gas across the entire cross-section of the respective containers 12 and 14.

The gas flow lines 80 and 82 of the effluent manifold 66 are interconnected by manifold lines 68, containing valves 70 and 72, and 74, containing valves 76 and 78. Manifold line 74 is coupled to an air feed line 84, joined in turn to a source 86 of clean dry air (CDA).

Manifold line 68 is joined to effluent discharge line 88.

As in the case of the inlet manifold 40, the valves 70, 72, 76 and 78 in the effluent manifold 66 are selectively actuatable with respect to their open or closed character. Preferably, such valves are automatic valves which are equipped with associated valve actuator elements (not shown) joined in turn to the aforementioned computer or cycle time control system (not shown), for automatic operation of the system valves in accordance with the cycle time program.

Container 12 as illustrated has a cooling coil 98 disposed therein, which is joined by coolant branch line 94 and coolant flow line 92 to a source 90 of coolant medium, such as water, (poly)ethylene glycol, (poly)propylene glycol or other suitable heat transfer medium. In like fashion, container 14 has a cooling coil 100 disposed therein and joined by coolant branch line 96 to coolant flow line 92.

The end of cooling coil 98 opposite that joined to coolant branch line 94, is joined to coolant return branch line 104, which in turn is joined to coolant main return line 106. Correspondingly, cooling coil 100 in container 14 is joined to coolant return branch line 102, which in turn is coupled to the coolant main return line 106.

The coolant main return line 106 is coupled to a heat exchanger 108 for extraction of heat from coolant flowing in the coolant main return line 106. The heat exchanger 108 discharges chilled coolant to the regenerated coolant feed line 110, which returns the chilled coolant to source 90, from which it is flows in coolant feed line 92 to the respective coils in the containers 12 and 14. Although not shown, the coolant flow circuit comprising lines 92, 94, 96, 102, 104, 106 and 110 will have disposed therein a pump or other circulator element, for effecting flow of coolant medium through the circuit.

In operation, one of the containers 12 and 14 is in an active processing mode, with effluent gas from the semiconductor manufacturing plant being flowed in line 38 through the inlet manifold 40 to the active one of the containers 12 and 14. For example, container 12 may be "on-stream" during this time, with valve 46 being open and valve 52 being closed. Concurrently, valve 48 is closed and valve 54 is open.

With the inlet manifold thus arranged, effluent gas flows through lines 38, 42 and 56, being discharged through distributor element 60 to the lower plenum space 24 for up-flow through the scrubber bed 16, to abate hydride constituents of the effluent gas stream. The resulting hydride-depleted effluent gas then flows into upper plenum space 32 of container 12 and is collected by the distributor element 112 (functioning in a reverse mode, as a collector), and flows in line 80 into the discharge manifold 66.

In the discharge manifold, valves 70 and 78 are open, and valves 72 and 76 are closed. The treated effluent gas stream thereby flows in line 80 to manifold line 68 and then into effluent discharge line 88 for discharge from the effluent abatement process system 10.

Concurrently with container 12 being in an active processing mode, container 14 is being regenerated by flow of clean dry air through the bed 18 therein. During such operation, clean dry air flows from clean dry air (CDA) source 86 through line 84 to the manifold 66, flowing through manifold line 74 (valve 78 being open) into line 82 for entry into the upper plenum space 34 of container 14. The thus-introduced clean dry air is discharged by the distributor element 114 and flows through the bed 18 of dry scrubber material, flowing downwardly to the lower plenum space 26.

In the lower plenum space 26, the effluent clean dry air is collected at distributor element 62 and flows into line 58 of the inlet manifold 40. In the inlet manifold, valve 54 is open, so that the effluent clean dry air flows from line 58 through line 50 to effluent clean dry air discharge line 64, from which it passes out of the effluent abatement process system.

During the flow of clean dry air through the bed 18 of dry scrubber material, the heat of reaction generated in the oxidation reaction is dissipated from the bed, by heat transfer to the coolant medium flowed through coolant coil 100. Coolant is supplied to the coolant coil 100 through the aforementioned flow circuit, being pumped from source 90 through lines 92 and 96 to the coolant coil 100, and being returned through lines 102, 106 and 110 to the source 90, with heat exchange removal of the sensible heat from the coolant medium, in heat exchanger 108.

Although the coolant flow circuit in some instances may be valved and operated to selectively flow coolant medium through one or the other of the respective coils in the respective containers, the coolant medium preferably is continuously flowed through the coolant flow circuit and the constituent cooling coils 98 and 100.

Thus, during regeneration operation to renew the bed of dry scrubber material for active, on-stream processing of effluent, clean dry air from source 86 is flowed through lines 84, 74 and 82, through container 14, and lines 58, 50 and 64.

After a predetermined period of operation, the flows are switched, so that the previously regenerated bed 18 is converted to active processing of effluent from the semiconductor manufacturing plant 36, and the bed 16 undergoes regeneration. The system valves 46, 48, 52, 54, 70, 72, 76 and 78 thus are periodically switched between their open and closed positions, to effectuate the desired flows through the respective containers 12 and 14, in a cyclic, alternating and repetitive manner.

For purposes of monitoring the temperature of the dry scrubber beds, a thermal monitoring device 116 may be deployed at the upper end region of the bed 16, as illustrated. In like manner, a thermal monitoring device 118 may be deployed at the upper end region of the bed 18. The respective thermal monitoring devices 116 and 118 may be linked in signal transmission relationship with a computer or other automatic process control means, such as the computer operatively coupled with the valve actuators of the valves in the inlet and discharge manifolds, to effect switching operation of the beds in response to the monitored temperature of the beds. In this respect, a number of thermal monitoring devices, e.g., thermocouples, temperature probes, pyroelectric devices, etc., may be employed along the length of the bed in the direction of gas flow therethrough as shown in FIG. 4, or otherwise in a selected arrangement for thermal management of the effluent abatement process system.

Additionally, for purposes of monitoring the abatement effectiveness of hydrides, sampling ports to determine breakthrough of unabated hydrides may be deployed at the upper end region of beds 16 and 18, as illustrated. The respective sampling ports 122 and 120 may be linked in signal transmission relationship with a computer or other automatic process control means, such as the computer operatively coupled with the valve actuators of the valves in the inlet and discharge manifolds, to effect switching operation of the beds in response to the capacity of the dry scrubber material.

Further, while the embodiment of the invention illustratively shown in FIG. 3 is provided with two containers of dry scrubbing material, it will be recognized that the invention may be practice with a single bed of the dry scrubbing material, being operated in a batch processing mode, e.g., with a surge tank being provided for hold-up of the effluent while the dry scrubbing material bed is undergoing air oxidation regeneration. Further, a single bed of the dry scrubbing material without a surge tank may be implemented which allows for oxidant flow during periods when the tool is offline. Alternatively, it will be appreciated that the invention may be practiced with a greater number of beds than in the illustrative embodiments of FIGS. 3 and 4, with corresponding modification of the manifolding, valving and thermal management sub-systems in such other embodiments.

FIG. 4 illustrates another preferred embodiment of the present invention. The dry scrubber system shown in FIG. 4 illustrates a single directional flow of the oxidant and effluent stream through the dry scrubbing system of the present invention. Further, the system shown in FIG. 4 includes similar components as described hereinabove relating to the system of FIG. 3, although not shown. The flow of oxidant and effluent process streams may be introduced simultaneously into the system inlet manifold 144, or more preferably, alternatingly and repetitively until abatement of essentially all hydrides within the effluent process stream. The illustrated system provides for multiple valves as herein described above with regards to FIG. 3. The valves are switched between open and closed positions to effectuate the desired flows of the oxidant and/or process effluent stream. For instance, valves 146 may be closed to restrict the flow of oxidant during introduction of the process effluent into dry scrubber system. After a certain period of time, the flow is switched to provide for regeneration of the bed by opening valves 148 and closing valves 146. Valves 150 will be open during the regeneration process for exhausting air and closed during exhausting of the abated effluent process stream.

The system of FIG. 4 further shows the addition of a temperature monitoring device 140 comprising a plurality of temperature probes 142 or a similar devices positioned along the length of the bed. This multiple temperature probe arrangement provides for monitoring the temperature front along the entire bed to determine the capacity of the bed and anticipate depletion of activity. Also, shown is a sensor tube 154 to monitor the concentrations of hydrides in the gas stream at the 90% consumption point of the dry scrubber bed.

While the invention has been illustratively described herein with reference to various embodiments and disclosed features, it will be appreciated that the invention is not thus limited, but rather extends to and encompasses numerous variations, modifications and other embodiments. Accordingly, the invention is intended to be broadly construed and interpreted as including all such variations, modifications and other embodiments within the spirit and scope thereof, as hereinafter claimed.

What is claimed is:

1. An effluent abatement and regeneration process for abating hydride species in a hydride-containing effluent, said process comprising: (1) contacting the hydride-containing effluent with a dry scrubber material comprising a metal oxide that is reactive with the hydride species to substantially remove the hydride species from the effluent, until the capacity of the dry scrubber material for hydride species is at least partially exhausted, and (2) contacting at least partially exhausted capacity dry scrubber material with clean, dry air to at least partially regain the capacity of the dry scrubber material for the hydride species wherein step (2) is conducted on an at least partially exhausted dry scrubber material at essentially the same time as step (1) is conducted on dry scrubber material comprising a metal oxide that is reactive with the hydride species, wherein in the effluent abatement and regeneration process further comprising thermally managing the contacting steps (1) and (2) to maintain a temperature of the dry scrubber material below 100° C.

2. process of claim 1, wherein the clean, dry air contacts the exhausted capacity dry scrubber material in the absence of contact with the hydride-containing effluent.

3. The process of claim 1, wherein the metal oxide comprises a metal selected from the group consisting of copper, zinc, silver, cobalt, iron, nickel, manganese, chromium, molybdenum and combinations thereof.

4. The process of claim 1, wherein the effluent is free of chlorine-containing compounds.

5. The process of claim 1, wherein the hydride-containing effluent includes a metal hydride formed in a semiconductor manufacturing operation.

6. The process of claim 1, wherein the hydride-containing effluent includes a hydride species selected from the group consisting of arsine and phosphine.

7. The process of claim 1, wherein the thermally managing step comprises extracting heat from the dry scrubber material.

8. The process of claim 1, wherein the thermally managing step comprises heat exchanging the dry scrubber material with a coolant medium.

9. The process of claim 8, wherein the coolant medium comprises a coolant selected from the group consisting of water and ethylene glycol.

10. The process of claim 1, wherein steps (1) and (2) are carried out repetitively in alternating sequence thereof in multiple beds of dry scrubber material.

11. The process of claim 10, wherein a bed of the dry scrubber material is provided in a container through which hydride-containing effluent and clean, dry air are respectively cyclically, alternatingly and repetitively flowed to effect the contacting steps (1) and (2).

12. The process of claim 10, wherein the dry scrubber material comprises copper oxide.

13. The process of claim 1, wherein the dry scrubber material is provided in multiple beds thereof, further comprising separately flowing the hydride-containing effluent and clean, dry air to respective different ones of the multiple beds, in a cyclic operation in which each of the multiple beds undergoes contacting steps (1) and (2) in a continuing alternating and repetitive sequence.

14. The process of claim 1, wherein the dry scrubber material is provided in a cylindrical container through which the hydride-containing effluent and clean, dry air are selectively and sequentially flowed.

15. The process of claim 1, wherein the hydride-containing effluent derives from manufacture of III-V compound semiconductor products.

16. The process of claim 15, wherein the hydride-containing effluent comprises at least one hydride species selected from the group consisting of $AsH_3$, $PH_3$, TBA, TBP, $SiH_4$, $GeH_4$, $H_2S$, $H_2Se$ and combinations thereof.

17. The process of claim 1, wherein contacting steps (1) and (2) are carried out simultaneously.

18. An effluent abatement system for abating hydride species in a hydride-containing effluent, said process system comprising a multiplicity of beds of dry scrubber material that are reactive with the hydride species in the hydride-containing effluent to remove the hydride species from the effluent, a source of the hydride-containing effluent joined in gas supply relationship to each bed of dry scrubber material, a source of clean, dry air effective to regenerate the dry scrubber material subsequent to diminution of hydride removal capacity thereof, joined in clean, dry air supply relationship to each bed of dry scrubber material, and flow circuitry arranged to flow the hydride-containing effluent and the clean, dry air in contact with the bed of dry scrubber material wherein the flow circuitry is arranged so that at least one of the multiple beds is being contacted with effluent while at essentially the same time at least one other of the beds is being contacted with clean, dry air, means for thermally managing the system to maintain a temperature of the dry scrubber material below 100° C.

19. The effluent abatement system of claim 18, wherein the flow circuitry is arranged to repetitively and alternatingly flow the hydride-containing effluent and the clean, dry air in contact with each bed of dry scrubber material.

20. The effluent abatement system of claim 18, wherein the flow circuitry comprises valved manifolding coupling each of the hydride-containing effluent source and the clean, dry air source with the bed of dry scrubber material.

21. The effluent abatement system of claim 18, comprising a multiplicity of beds of the dry scrubber material, arranged for operation wherein each bed undergoes the steps of (1) contacting the hydride-containing effluent with the dry scrubber material in the bed, until the capacity of the dry scrubber material for hydride species is at least partially exhausted, and (2) contacting the at least partially exhausted capacity dry scrubber material with clean, dry air in the absence of contact with the hydride-containing effluent, to at least partially regain the capacity of the dry scrubber material for the hydride species.

22. The effluent abatement system of claim 18, further comprising a coolant flow circuit arranged in heat exchange relationship with each bed of dry scrubber material.

23. The effluent abatement system of claim 22, wherein the coolant flow circuit is a coil formed such that no significantly large region of the dry scrubbing bed is out of heat transfer relationship with the coil.

24. The effluent abatement system of claim 18, wherein the source of hydride-containing effluent comprises a semiconductor tool utilized for manufacturing a III-V semiconductor product.

25. The effluent abatement system of claim 18, wherein the dry scrubber material comprises a metal oxide material.

26. The effluent abatement system of claim 25, wherein the metal oxide comprises a metal selected from the group consisting of copper, zinc, silver, cobalt, iron, nickel, manganese, chromium, molybdenum and combinations thereof.

* * * * *